(12) United States Patent
Majewski et al.

(10) Patent No.: US 8,359,484 B2
(45) Date of Patent: Jan. 22, 2013

(54) APPARATUS AND METHOD FOR OPERATING A COMPUTING PLATFORM WITHOUT A BATTERY PACK

(75) Inventors: Joseph Steven Majewski, Strongsville, OH (US); Christopher Kikta, Pittsburgh, PA (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 13/243,249

(22) Filed: Sep. 23, 2011

(65) Prior Publication Data

US 2012/0017115 A1 Jan. 19, 2012

Related U.S. Application Data

(62) Division of application No. 12/233,364, filed on Sep. 18, 2008, now Pat. No. 8,037,354.

(51) Int. Cl.
*G06F 1/32* (2006.01)
*G06F 15/177* (2006.01)

(52) U.S. Cl. .......................................... 713/320; 713/2

(58) Field of Classification Search ............... 713/2, 320
See application file for complete search history.

(56) References Cited

U.S. PATENT DOCUMENTS

| | | | |
|---|---|---|---|
| 3,731,524 A | 5/1973 | Langley et al. |
| 3,822,095 A | 7/1974 | Hirschfeld |
| 3,928,094 A | 12/1975 | Angell |
| 3,976,862 A | 8/1976 | Curbelo |
| 4,284,412 A | 8/1981 | Hansen et al. |
| 4,478,076 A | 10/1984 | Bohrer |
| 4,478,077 A | 10/1984 | Bohrer et al. |
| 4,501,144 A | 2/1985 | Higashi et al. |
| 4,599,000 A | 7/1986 | Yamada |
| 4,651,564 A | 3/1987 | Johnson et al. |
| 4,664,056 A | 5/1987 | Jehanno |
| 4,683,159 A | 7/1987 | Bohrer et al. |
| 4,695,034 A | 9/1987 | Shimizu et al. |
| 4,704,033 A | 11/1987 | Fay et al. |
| 4,745,279 A | 5/1988 | Karkar et al. |
| 4,818,263 A | 4/1989 | Mitch |
| 4,874,949 A | 10/1989 | Harris et al. |
| 4,911,616 A | 3/1990 | Laumann, Jr. |
| 4,932,989 A | 6/1990 | Presby |

(Continued)

FOREIGN PATENT DOCUMENTS

DE 3127560 2/1983

(Continued)

OTHER PUBLICATIONS

Altendorf et al., "Differential Blood Cell Counts Obtained Using A Microchannel Based Flow Cytometer", Solid State Sensors & Actuators, vol. 1, 531, 1997.

(Continued)

*Primary Examiner* — Thomas Lee
*Assistant Examiner* — Terrell Johnson
(74) *Attorney, Agent, or Firm* — Seager Tufte & Wickhem LLC (57) ABSTRACT

An application control engine computing platform having a shut-down mechanism that permits the platform to adequately start up and operate upon return of power after a power interruption, without a need of a battery pack. The mechanism may target the saving of control object runtime values and operational settings of those objects, rather than the saving of the complete set of objects, and all unsaved alarm and history records upon a power interruption.

15 Claims, 7 Drawing Sheets

U.S. PATENT DOCUMENTS

| | | | |
|---|---|---|---|
| 5,017,497 A | 5/1991 | Gerard de Grooth et al. | |
| 5,050,429 A | 9/1991 | Nishimoto et al. | |
| 5,078,581 A | 1/1992 | Blum et al. | |
| 5,082,242 A | 1/1992 | Bonne et al. | |
| 5,085,562 A | 2/1992 | van Lintel | |
| 5,096,388 A | 3/1992 | Weinberg | |
| 5,108,623 A | 4/1992 | Cangelosi et al. | |
| 5,129,794 A | 7/1992 | Beatty | |
| 5,171,132 A | 12/1992 | Miyazaki et al. | |
| 5,176,358 A | 1/1993 | Bonne et al. | |
| 5,185,641 A | 2/1993 | Igushi et al. | |
| 5,194,909 A | 3/1993 | Tycko | |
| 5,219,278 A | 6/1993 | van Lintel | |
| 5,224,843 A | 7/1993 | van Lintel | |
| 5,244,537 A | 9/1993 | Ohnstein | |
| 5,315,861 A | 5/1994 | Egan et al. | |
| 5,323,999 A | 6/1994 | Bonne et al. | |
| 5,441,597 A | 8/1995 | Bonne et al. | |
| 5,452,878 A | 9/1995 | Gravesen et al. | |
| 5,457,526 A | 10/1995 | Kosaka | |
| 5,510,267 A | 4/1996 | Marshall | |
| 5,528,045 A | 6/1996 | Hoffman et al. | |
| 5,557,777 A * | 9/1996 | Culbert | 713/2 |
| 5,570,193 A | 10/1996 | Landa et al. | |
| 5,601,080 A | 2/1997 | Oppenheimer | |
| 5,616,501 A | 4/1997 | Rodriguez et al. | |
| 5,633,724 A | 5/1997 | King et al. | |
| 5,683,159 A | 11/1997 | Johnson | |
| 5,716,852 A | 2/1998 | Yager et al. | |
| 5,717,631 A | 2/1998 | Carley et al. | |
| 5,726,404 A | 3/1998 | Brody | |
| 5,726,751 A | 3/1998 | Altendorf et al. | |
| 5,757,476 A | 5/1998 | Nakamoto et al. | |
| 5,760,900 A | 6/1998 | Ito et al. | |
| 5,793,485 A | 8/1998 | Gourley | |
| 5,799,030 A | 8/1998 | Brenner | |
| 5,822,170 A | 10/1998 | Cabuz et al. | |
| 5,836,750 A | 11/1998 | Cabuz | |
| 5,839,807 A | 11/1998 | Perlo | |
| 5,863,502 A | 1/1999 | Southgate et al. | |
| 5,880,474 A | 3/1999 | Norton et al. | |
| 5,893,722 A | 4/1999 | Hibbs-Brenner et al. | |
| 5,901,939 A | 5/1999 | Cabuz et al. | |
| 5,922,210 A | 7/1999 | Brody et al. | |
| 5,924,294 A | 7/1999 | Tiby | |
| 5,932,100 A | 8/1999 | Yager et al. | |
| 5,939,326 A | 8/1999 | Chupp et al. | |
| 5,948,684 A | 9/1999 | Weigl et al. | |
| 5,970,315 A | 10/1999 | Carley et al. | |
| 5,971,158 A | 10/1999 | Yager et al. | |
| 5,972,710 A | 10/1999 | Weigl et al. | |
| 5,974,867 A | 11/1999 | Forster et al. | |
| 6,007,775 A | 12/1999 | Yager | |
| 6,032,689 A | 3/2000 | Tsai et al. | |
| 6,054,335 A | 4/2000 | Sun et al. | |
| 6,082,185 A | 7/2000 | Saaski | |
| 6,091,197 A | 7/2000 | Sun et al. | |
| 6,091,537 A | 7/2000 | Sun et al. | |
| 6,094,293 A | 7/2000 | Yokoyama et al. | |
| 6,097,485 A | 8/2000 | Lievan | |
| 6,097,859 A | 8/2000 | Solgaard et al. | |
| 6,106,245 A | 8/2000 | Cabuz | |
| 6,109,889 A | 8/2000 | Zengerle et al. | |
| 6,116,756 A | 9/2000 | Peeters et al. | |
| 6,124,663 A | 9/2000 | Haake et al. | |
| 6,139,800 A | 10/2000 | Chandler | |
| 6,179,586 B1 | 1/2001 | Herb et al. | |
| 6,184,607 B1 | 2/2001 | Cabuz et al. | |
| 6,215,221 B1 | 4/2001 | Cabuz et al. | |
| 6,237,619 B1 | 5/2001 | Maillefer et al. | |
| 6,240,944 B1 | 6/2001 | Ohnstein et al. | |
| 6,249,341 B1 | 6/2001 | Basiji et al. | |
| 6,281,975 B1 | 8/2001 | Munk | |
| 6,382,228 B1 | 5/2002 | Cabuz et al. | |
| 6,537,501 B1 | 3/2003 | Holl et al. | |
| 6,549,275 B1 | 4/2003 | Cabuz et al. | |
| 6,576,194 B1 | 6/2003 | Holl et al. | |
| 6,597,438 B1 | 7/2003 | Cabuz et al. | |
| 6,691,113 B1 * | 2/2004 | Harrison et al. | 1/1 |
| 6,700,130 B2 | 3/2004 | Fritz | |
| 6,832,120 B1 * | 12/2004 | Frank et al. | 700/65 |
| 6,837,476 B2 | 1/2005 | Cabuz et al. | |
| 6,889,567 B2 | 5/2005 | Cabuz | |
| 6,970,245 B2 | 11/2005 | Fritz et al. | |
| 7,069,540 B1 | 6/2006 | Sievert | |
| 8,037,354 B2 | 10/2011 | Majewski et al. | |
| 2002/0127144 A1 | 9/2002 | Mehta | |
| 2003/0083685 A1 | 5/2003 | Freeman et al. | |
| 2003/0142291 A1 | 7/2003 | Padmanabhan et al. | |
| 2004/0163464 A1 | 8/2004 | Nakada et al. | |
| 2004/0202581 A1 | 10/2004 | Berndt | |
| 2004/0259241 A1 | 12/2004 | Barringer, Jr. | |
| 2005/0073686 A1 | 4/2005 | Roth et al. | |
| 2005/0105077 A1 | 5/2005 | Padmanabhan et al. | |
| 2005/0106739 A1 | 5/2005 | Cabuz et al. | |
| 2005/0106742 A1 | 5/2005 | Wahl | |
| 2005/0118723 A1 | 6/2005 | Padmanabhan et al. | |
| 2006/0139069 A1 * | 6/2006 | Frank et al. | 327/143 |
| 2007/0003434 A1 | 1/2007 | Padmanabhan et al. | |

FOREIGN PATENT DOCUMENTS

| | | |
|---|---|---|
| DE | 10122321 | 4/2002 |
| EP | 0269076 | 6/1988 |
| EP | 1001326 | 5/2000 |
| EP | 1134548 | 9/2001 |
| EP | 2002243572 | 8/2002 |
| JP | 61066947 | 4/1986 |
| JP | 6316580 | 7/1988 |
| JP | 10073528 | 3/1998 |
| JP | 2000056228 | 2/2000 |
| JP | 331215 | 4/2000 |
| JP | 2000266233 | 9/2000 |
| JP | 2002503331 | 1/2002 |
| JP | 2004505272 | 2/2004 |
| WO | 9527199 | 10/1995 |
| WO | 9721090 | 6/1997 |
| WO | 9960397 | 11/1999 |
| WO | 0109598 | 2/2001 |
| WO | 0210713 | 2/2002 |
| WO | 0210714 | 2/2002 |
| WO | 2004079241 | 9/2004 |

OTHER PUBLICATIONS

Altendorf et al., "Implementation of Novel Optical Detection Methods for Clinically Important Blood Analytes Using Microfabricated Flow Structures (T-Sensors™)", MicroTAS 98, Banff, Canada, Apr. 1996.

Altendorf et al., "Microfabrication Technology for Research and Diagnostics, Silicon Microchannel Optical Flow Cytometry", SPIE Proceedings, Biomedical Optics 96, Jan. 1996.

Altendorf et al., "Results Obtained Using A Prototype Microfluidics-Based Hematology Analyzer", SPIE Biomedical Optics 97, 1997.

Ax, "The Cost to Build Device-to-Enterprise Solutions Just Went Down . . . AXponentially", 8 pages, prior to Sep. 18, 2008.

Cabuz et al., "Mesoscopic Sampler Based on 3D Array of Electrostatically Activated Diaphragms", The 10th Int. Conf. On Solid-State Sensors and Actuators, Transducers '99, p. 1890-1, Sendai Japan, Jun. 7-12, 1999.

Darling et al., "Integration Of Microelectrodes With Etched Microchannels For In-Stream Electrochemical Analysis", MicroTAS 98, Banff, Canada, Apr. 1998.

Fedder et al., "Laminated High-Aspect-Ratio Microstructures in a Conventional CMOS Process", Proc. Micro Electro Mechanical Systems Workshop, MEMS 96, San Diego, California, Feb. 11-15, 1996, pp. 13-18.

Hatch et al., "Microfluidic Approaches To Immunoassays", SPIE conference on Micromachining and Microfabrication Symposium at Santa Clara, CA, Sep. 20-22, 1999.

http://www.micronics.net/hfilter.htm, pp. 1-3, downloaded Jun. 14, 2000.

http://www.micronics.net/mcytometry.htm, pp. 1-4, downloaded Jun. 14, 2000.

http://www.micronics.net/orcafluidics.htm, pp. 1-4, downloaded Jun. 14, 2000.

http://www.micronics.net/tsensor.htm, pp. 1-4, downloaded Jun. 14, 2000.

Huang et al., "Development Of A Flow Cytometry Based Miniature Chemical Fluid Analysis System Using Fluorescent Microbeads", SPIE Biomedical Optics, BIOS 97, conference proceedings, 1997.

Lehman et al., "High-Frequency Modulation Characteristics of Red VCSELs", Electronics Letters, Feb. 13, 1997, vol. 33(4), pp. 298-300. Copyright 1997 IEE.

"Liquid Flow Sensors 5nL/min to 5 µL/min Flow Range, X116161-AW," Honeywell, 2 pages, 2004.

"Liquid Flow Sensors," Honeywell, 2 pages, 2004.

Ohnstein et al., "Micromachined Silicon Microvalve", Proceedings of MEMS, 1990, IEEE Micro Electromechanical Systems, Napa Valley, California, Feb. 11-14, 1990, pp. 95-98.

Roulet et al., "Fabrication of Multilayer Systems Combining Microfluidic and Microoptical Elements for Fluorescence Detection," Journal of Microelectromechanical Systems, vol. 10 No. 44, pp. 483-491, Dec. 4, 2001.

Shapiro, "Practical Flow Cytometry", third edition, p. 237, 1995.

Strzelecka et al., "Parallel Free-Space Optical Interconnect Based on Arrays of Vertical-Cavity Lasers and Detectors with Monolithic Microlenses", Applied Optics, v. 37(14), May 10, 1998, pp. 2811-2821. Copyright 1998 Optical Society of America.

Terstappen et al., "Four-Parameter White Blood Cell Differential Counting Based on Light Scattering Measurements", Alan R. Liss, Inc., Cytometery 9:39-43, 1988.

Toshiyoshi et al., "Micromechanical Lens Scanner for Fiber Optic Switches", Proc. 3rd International Conference on Micro Opto Electro Mechanical Systems (MOEMS 99), Aug. 30-Sep. 1, 1999, Mainz, Germany, pp. 165-170.

Toshiyoshi et al., "Surface micromachined 2D Lens Scanner Array", Proc. IEEE?LEOS International Coference on Optical EMMS/Sheraton Kauai Resort, Kauai, Hawaii, Aug. 21-24, 2000, 3 pages.

Tridium, "Vycon JACE-200", 2 pages, 2007.

Tridium, "Vycon JACE-600", 2 pages, 2007.

Tridium, Niagara Architecture Overview, 5 pages, Copyright 2000-2007.

Tridium, Niagara Component Model, 2 pages, Copyright 2000-2007.

Tuantranont et al., "Flip Chip Integration of Lenslet Arrays on Segmented Deformable Micromirrors", Part of the Symposium on Design, Test and Microfabrication of MEMS and MOEMS, Paris, France, Mar.-Apr. 1999, SPIE vol. 3680, 0277-786X/99, pp. 668-678.

Tuantranont et al., "MEMS-Controllable Microlens Array For Beam Steering and Precision Alignment in Optical Interconnect Systems", Solid-State Sensor and Actuator Workshop, Hilton Head Island, South Carolina, Jun. 4-8, 2000, pp. 101-104.

Weigl et al, "Silicon-Microfabricated Diffusion-Based Optical Chemical Sensor", Reprint from "Sensors & Actuators" B 38-39, 452-457, 1997.

Weigl et al, "Microfluidic Diffusion-Based Separation And Detection", Science, vol. 283, pp. 346-347, Jan. 15, 1999.

Weigl et al, "Optical And Electrochemical Diffusion-Based Detection Of Analytes In Complex Samples Using Microfabricated Flow Structures (T-SensorSTM)", Micro- and nanofabn'cated electro-optical mechanical systems for biomedical and environmental applications II-SPIE vol. 3606, Jan. 25-26, 1999.

Weigl et al, "Simultaneous Self-Referencing Analyte Determination In Complex Sample Solutions Using Microfabricated Flow Structures (T-Sensors™)", Proceedings of MicroTAS 98, 81-4, Banff, Canada, 1998.

Weigl et al., "Diffusion-Based Optical Chemical Detection In Silicon Flow Structures", B. Weigl et al., Analytical Methods & Instrumentation, µTTAS 96 special edition, 1996.

Weigl et al., "Fluorescence And Absorbance Analyte Sensing In Whole Blood And Plasma Based On Diffusion Separation In Silicon-Microfabricated Flow Structures (T-Sensors™)", Biomedical Optics, vol. 6, No. 1, Jul. 1997.

Weigl et al., "Rapid Sequential Chemical Analysis Using Multiple Fluorescent Reporter Beads", µTTAS 96 Conference Proceedings, 1996.

Weigl, "Microfluidic Diffusion Based Electrochemical Detection Using Microfabricated Flow Structures (T-Sensors™)", Analytical Chemistry, submitted 1999.

Weigl, "Whole Blood Assays Using Microfluidics-Based T-SensorSTm Technology", Medical Design Online, http://news.medicaldesignonline.com/featuresarticles/19990416-5922.html, Apr. 1999.

Yager et al., "Applying Microfluidic Chemical Analytical Systems To Imperfect Samples", Micro Total Analysis Systems 98, D. Harrison & A. van den Berg (ed.), Kluwer Academic Publishers, Dordrecht, 207-212, 1998.

Yager et al., "Design Of Microfluidic Sample Preconditioning Systems For Detection Of Biological Agents In Environmental Samples", Yager, M. et al., SPIE Proceedings, 3515, 252-259, 1998.

* cited by examiner

APPARATUS AND METHOD FOR OPERATING A COMPUTING PLATFORM WITHOUT A BATTERY PACK

The present application is a Divisional of U.S. patent application Ser. No. 12/233,364, filed Sep. 18, 2008, which is hereby incorporated by reference.

BACKGROUND

The invention pertains to computing platforms and particularly to power interruptions to the platforms and their recovery.

SUMMARY

The present invention includes a mechanism that provides for operation of an application control engine computing platform without a battery pack. The computing platform may incur a power interruption and the mechanism can assure the previous operational state without the battery pack, so that upon return of power the computing platform can return to normal/continued operation without concerns.

DESCRIPTION

The present invention is a mechanism which may allow the removal of the Tridium™ Java™ application control engine (JACE™) platform battery pack in selected deployments by providing an alternate way of storage persistence in case of a loss of power. Trademark terms herein are generally indicated just once with a superscript mark "TM"; thus, the same terms without the marks should be regarded as trademarks. The invention may be regarded herein as the "present" system, mechanism, or the like.

The JACE™ is an embedded computing platform designed and manufactured by Tridium, Inc. It may be regarded as a dedicated computing platform. A key feature of the JACE platform is its ability to shut down gracefully in the event of a power loss. When power is lost, the JACE platform saves the entire state of the running "station" including Java objects in the station, the current runtime values of control objects, unsaved alarm records, unsaved history records and the operational parameters for the Java objects. When power is restored to the JACE, it reconstitutes the information saved at the time of power interruption thus restoring the JACE to its last known good running state. The largest portion of the saved information is collection of objects and their associated runtime and setting values. The JACE encodes this information into an XML-formatted object graph representing the entire object space of the station. The encoded information is stored in the JACE's persistent flash file system in a file referred to as a building automation Java architecture (BAJA) object graph (BOG). This usual sort of shutdown with the noted extent of saving information of the platform requires significant power after a power loss to the platform.

The main software program in control of the JACE is the NiagaraAX Framework™. NiagaraAX™ is a Java application. Due to the non-determinism and relatively slow performance of Java, the operation of saving a station's state to a BOG in persistent storage may take on the order of several minutes to accomplish. The power supply circuitry on many embedded computing platforms including the JACE provide capacitors that filter the rectified power supply input and supply some limited measure of stored charge after line voltage has been removed. This is typically on the order of less than 50 milliseconds and often less than 30 milliseconds. The JACE platform therefore uses a battery pack to act as an emergency shutdown power supply. The battery can supply power long enough to allow for complete encoding and storage of the BOG to the persistent file system.

Usage of a battery pack with the JACE platform presents a number of problems including battery lifespan, environmental concerns, and added weight and cost of the battery pack. It is desirable therefore to allow operation of the JACE platform without the battery pack.

The usual shutdown sequence of the JACE involves saving the complete set of Java objects and unsaved alarm and history records. The present system addresses one of the important subcomponents of this sequence which includes the saving of the last known runtime values of control objects and operation parameters for the control objects. The system is not intended to accomplish the same exact steps as the usual JACE shutdown sequence, but rather to provide a mitigation of the highest risk areas. If a station loses and regains power and its control objects' runtime values are set to invalid values, improper operation of the control application may result. Outputs that are controlling external equipment may thus be set to incorrect values resulting in unintended negative consequences. The present system therefore targets the saving runtime values of control objects and operational settings and/or parameters of those objects.

The present system in its first version is a set of NiagaraAX Java objects derived from the NiagaraAX BComponent™ Java class. These objects, referred to herein as "persist objects" allow persistence of the primitive Niagara data types used in control objects such as BStatusNumeric™, BBoolean™ and BEnum™. Upon initial creation, each persist object constructs a small data file in the persistent file system of the JACE. The filename is derived from an object reference designator (ORD) given to the persist object by the NiagaraAX Framework. This is an alphanumeric string. The file is stored in the station's persistent file area in a designated directory. The file content is the binary representation of either a Java double, Java Boolean or Java Integer data type depending on the persist object type. The persist object provides Java methods for both reading from and writing to its own persistence file.

Control logic on JACE platforms is accomplished with Niagara wiresheets. "Wiresheets" are a graphical means of connecting BComponent-derived Niagara objects with Niagara "link" objects. BComponent objects expose their inputs and outputs via a Niagara Java construct called "slots". The output slots of top-level components in wiresheets drive the input slots of succeeding objects. The topmost components in a Niagara wiresheet are often field device inputs and the bottommost components are often field device outputs.

To enable the persistence of a control object, the input slot of the persist object of the appropriate type is attached to the output slot or slots of the desired control object. The output slot of the persist object is then attached to the input slot of the original intended target object. Persist objects are to be connected between the object whose runtime value is to be preserved and the next downstream target of the output value.

A second version of the present system will provide for automatic attachments of persist objects to existing wiresheets. The first version of the system requires attachment of a persist object to control objects manually with the Niagara wiresheet tool. Determination of a location to attach persist object may be automated by using Niagara's BAJA query language (BQL) mechanism to find all of the top-most control components and attaching persist objects between them and their next downstream components.

The Niagara BComponent-derived objects provide a Java method named "changed( )". "changed( )" is a so-called callback method. The NiagaraAX framework invokes this "changed( )" callback on BComponent-derived objects when the value of the object has been altered by external action. Included in the triggering external actions is the change of value of a slot. The persist objects are connected to the output value slots of control objects. When these values change, the "changed( )" callback is invoked. The very first invocation of "changed( )" is when the wiresheet is first instantiated by the framework and is entering its first control pass. Persist objects use the "changed( )" callback to determine when to write the current value to persistent storage and when to read the persisted value back into the object.

On the first invocation of "changed( )", a persist object attempts to read the previously saved value of the object from its persistence file. A default value is used if it has not been previously saved. If a persisted value is retrieved, the persist object's output slot's value is set to the persisted value, thus restoring its last known runtime state before use of the value by the next downstream control object. The restoration of the runtime value overrides the value loaded by NiagaraAX from its normal shutdown/restore sequence because it occurs almost immediately after that sequence has restored the value but before the value is used by a downstream object.

Subsequent invocations of "changed( )" occur because the persist object's parent object's output value has been updated, and therefore trigger the persist object to save the current value to persistent storage. Values are persisted virtually immediately when changed. To avoid undue stress on the flash filesystem of the JACE, the persist object has several mitigation schemes. One is that values are checked to ensure that they differ since the last write to avoid persisting the same value multiple times. Another is that a configurable time-based anti-thrash algorithm is provided to limit the number of writes in a specified time period. Still another is that a configurable range-based anti-thrash algorithm is provided such that values may be written only if they have changed by more than a specified increment.

An important difference between the present system and the previous JACE shutdown sequences is that the present system accomplishes the saving of runtime state of objects immediately when it changes rather than waiting for a power failure. The problem space is reduced from an "order of N" problem to an "order of 1" problem where N is the number of Java objects. To ensure that runtime values are captured in the event of a power failure, the present version must ensure that the time to persist a single object's value is less than the amount of runtime provided by the JACE's power supply capacitors. The system's persistence time has been measured on a JACE platform and is between 5 and 9 milliseconds, and may almost always be less than 20 milliseconds. The capacitors used on the power supply of a JACE are capable of providing approximately 20-30 milliseconds of continued runtime in the event of power failure.

Figure 1:
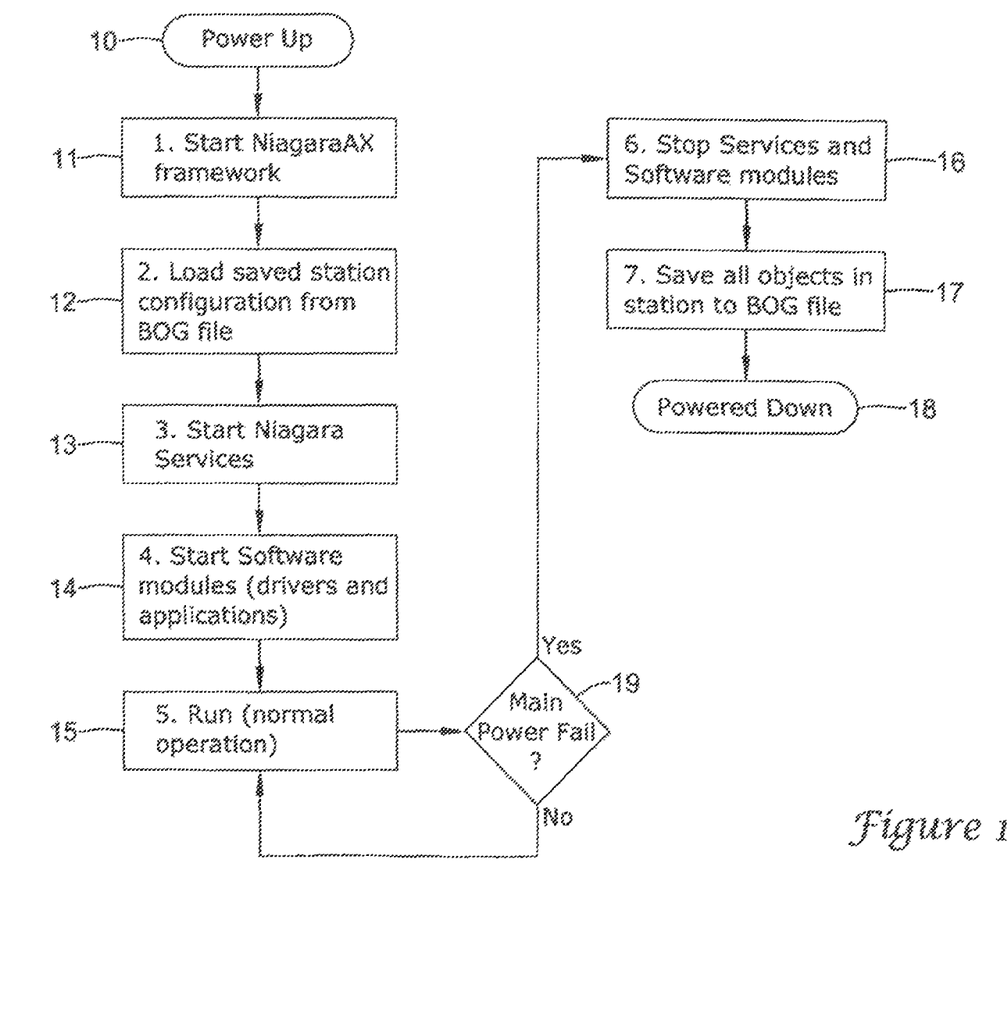
FIG. 1 is a diagram of a sequence of operations on a computer running a NiagaraAX™ framework.

FIG. 1 is a diagram of a simplified sequence of operations on a JACE computer running a Tridium NiagaraAX™ framework. The computer may be powered up at symbol 10. Then the NiagaraAX framework may be started at step 11. At step 12, a saved station configuration may be loaded from a BOG file. The Niagara services may be started at step 13. The software modules (drivers and applications) may be started at step 14. The services and modules may be run (normal operation) at step 15. At symbol 19, a question may arise as to whether the main power has failed. If not, the services and modules will continue to run normally at step 15. If the main power does fail, then at step 16 the services and software modules are stopped, and at step 17, all of the objects in the station may be saved to the BOG file. Then the JACE is powered down. The steps beyond step 15 require the JACE computer to have battery power because steps 16 and 17 may require several minutes to complete. The present invention allows selected objects in a JACE computer to be stored and/or loaded without a battery by providing an alternate means of accomplishing step 17.

Figure 2:
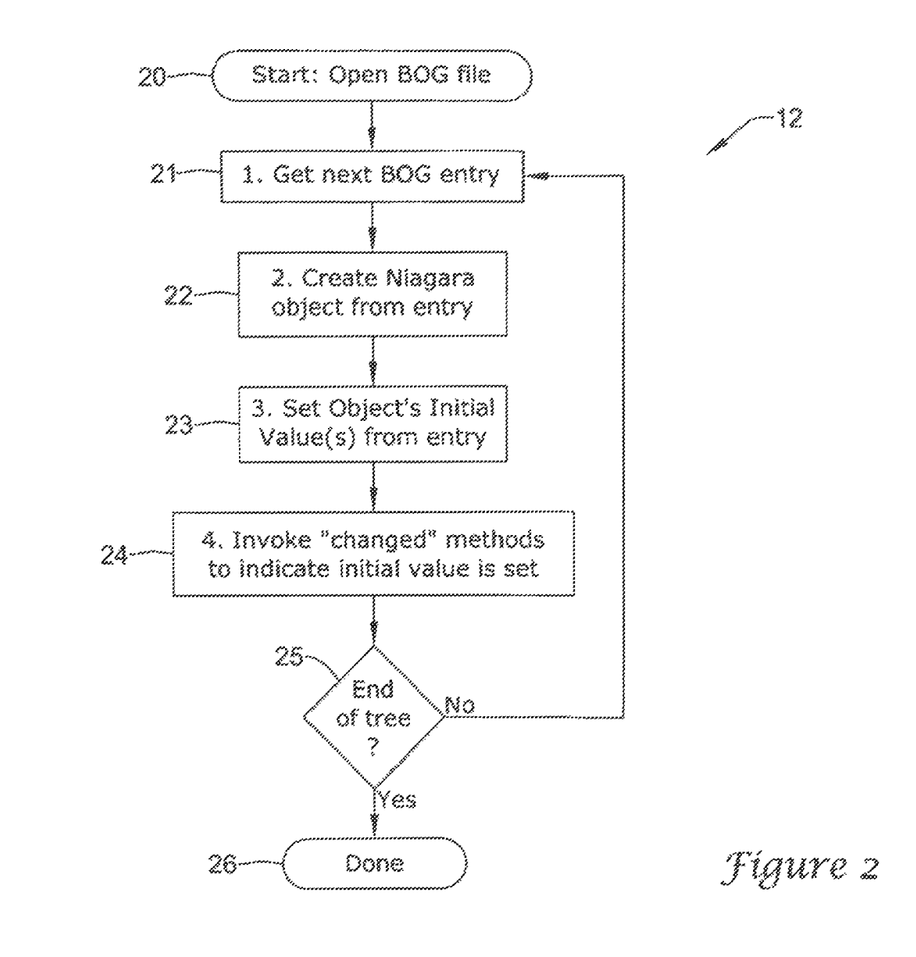
FIG. 2 is a diagram of an expansion of a load saved configuration from a BAJA object graph file process in FIG. 1.

FIG. 2 is an expansion of step 12 which is the "load saved station configuration from BOG file" process in FIG. 1. To start, the BOG file may be opened at symbol 20. Then at step 21, a BOG entry may be retrieved. A Niagara object may be created from the BOG entry at step 22. The object's initial value(s) may be set from entry at step 23. At step 24, "changed( )" callbacks may be invoked to indicate that the initial value is set. At symbol 25, the question "End of the tree?" may be asked. If the answer is no, then proceed through steps 21 through 25 for the next BOG entry. The question at symbol 25 may be continuously asked again and steps 21 through 25 repeated until the answer to the question at symbol 25 is yes. Then, symbol 26 indicating "Done" may be reached.

Figure 3:
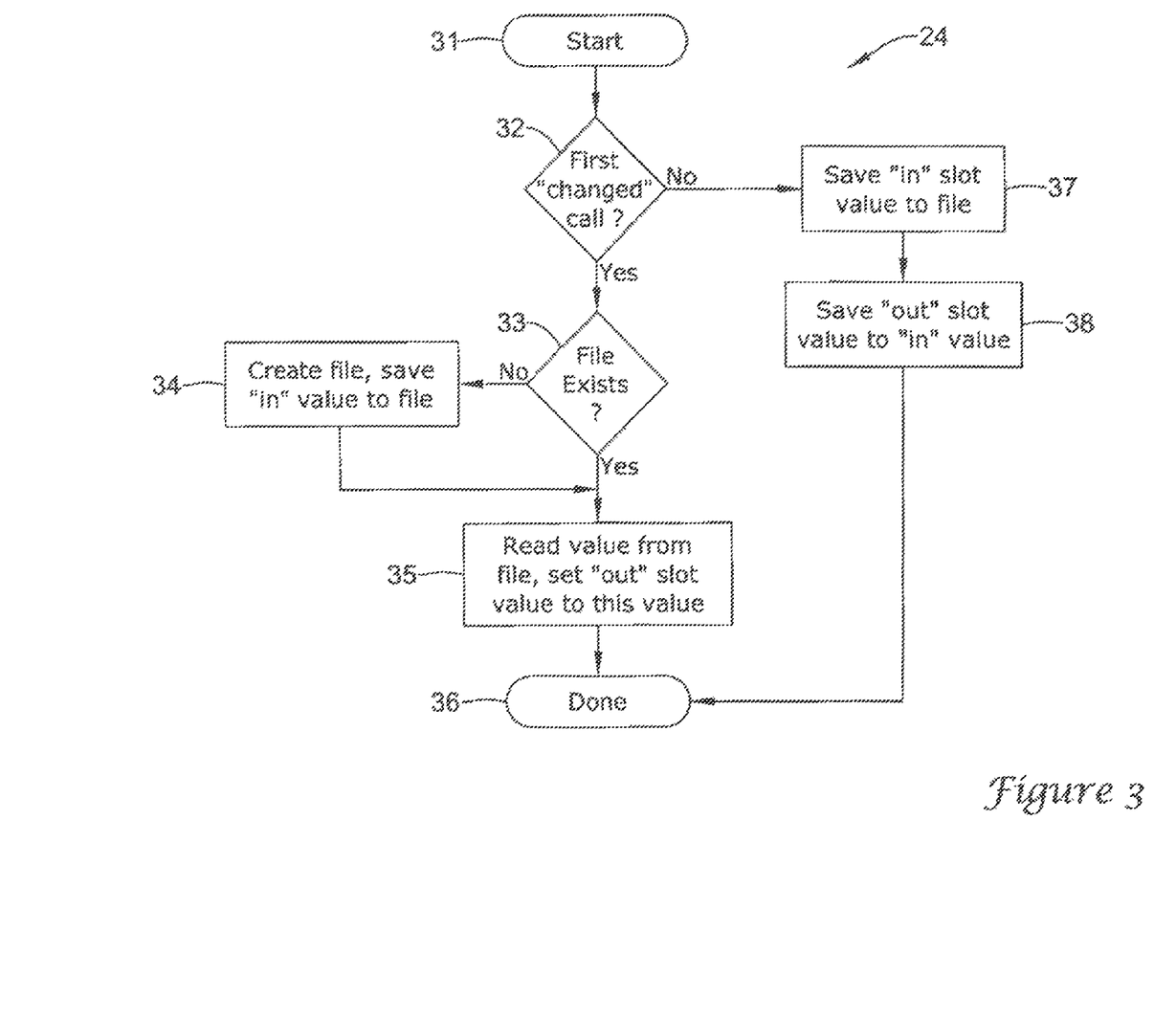
FIG. 3 is a diagram of a "changed( )" callback operation used by the present computing platform.

FIG. 3 is a diagram of an operation of the invention using the "changed( )" callback from NiagaraAX. The first "changed( )" callback occurs in the diagram of FIG. 2 at step 24 nearly immediately after the object is instantiated by NiagaraAX and gets its initial value from the BOG file. Subsequent "changed( )" callbacks are due to changes of value on the object. Since the object is linked to a parent object, it in effect saves/loads the parent object's value.

The flow diagram in FIG. 3 may start at symbol 31. The following symbol 32 has a question "First 'changed( )' call?" If the answer is yes, then a symbol 33 asks a question whether "File exists?" If the answer is no, then at block 34 the file may be created and saved "in" value to the file. Next, one may go to block 35 which indicates "Read value from file, set 'out' slot value to this value." Then one may proceed to the "Done" symbol 36.

If the answer to the question, "File exists?" at symbol 33 is yes, then one goes to block 35 which indicates "Read value from file, set 'out' slot value to this value." Then one may proceed to the symbol 36 indicating "Done."

If the answer to the question "First 'changed( )' call?" in symbol 32 is no, then save "in" slot value to file at block 37. Following block 37, an "out" slot value may be set to the "in" value at block 38. Then one may proceed to symbol 36 indicating "Done".

Figure 4:
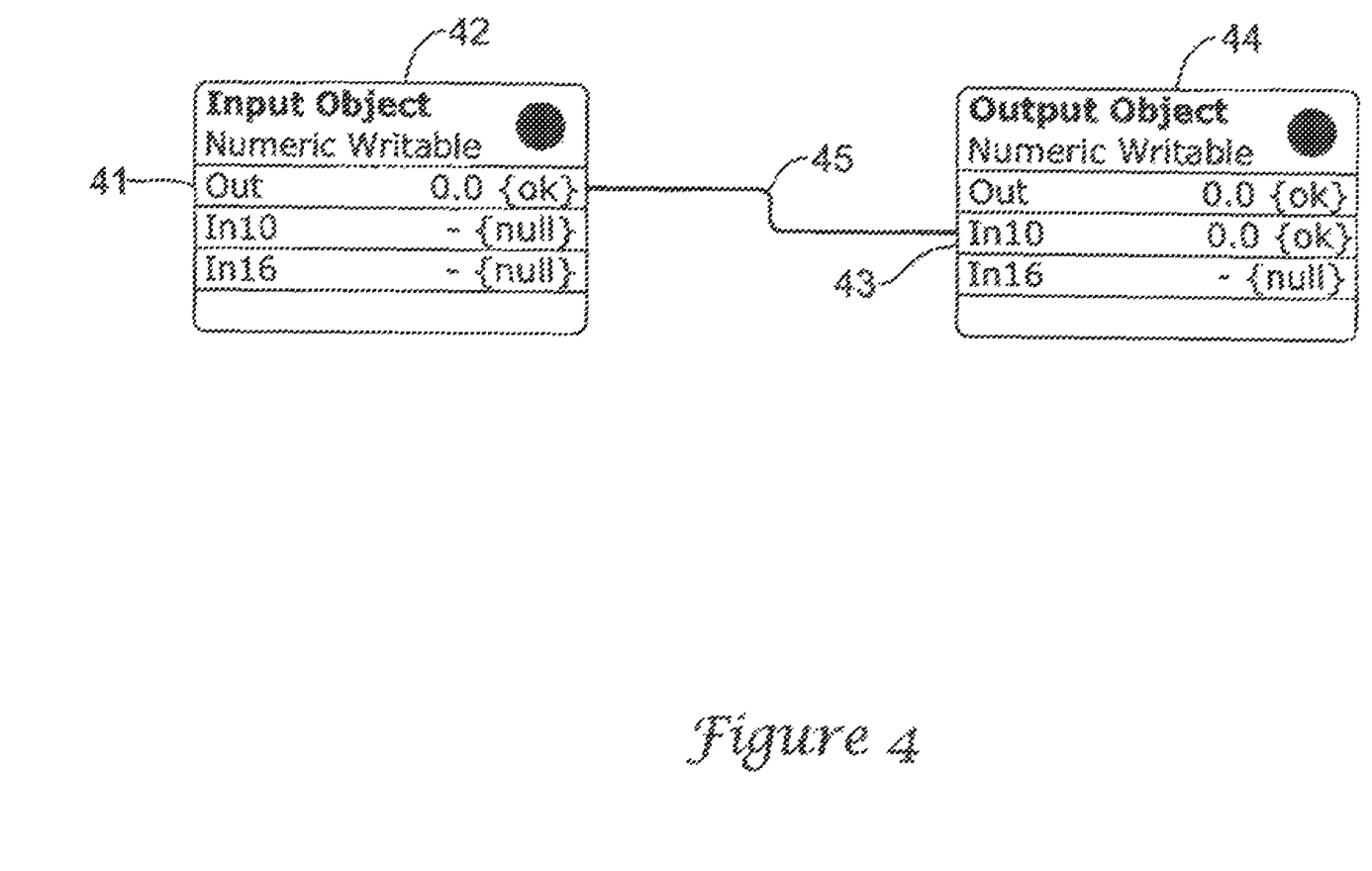
FIG. 4 is a diagram of a control sequence relative to an input object and an output object without the present system.

FIG. 4 is diagram showing a simple control sequence using NiagaraAX without the invention. Data comes from an "Out" slot 41 in an Input Object 42 to "In 10" slot 43 of an Output Object 44, via line 45. When "Out" changes value, Niagara sets "In 10" value and then invokes the "changed( )" callback of Output Object 44 indicating a change of value to "In 10". Input and output objects 42 and 44 may be numeric writable.

Figure 5:
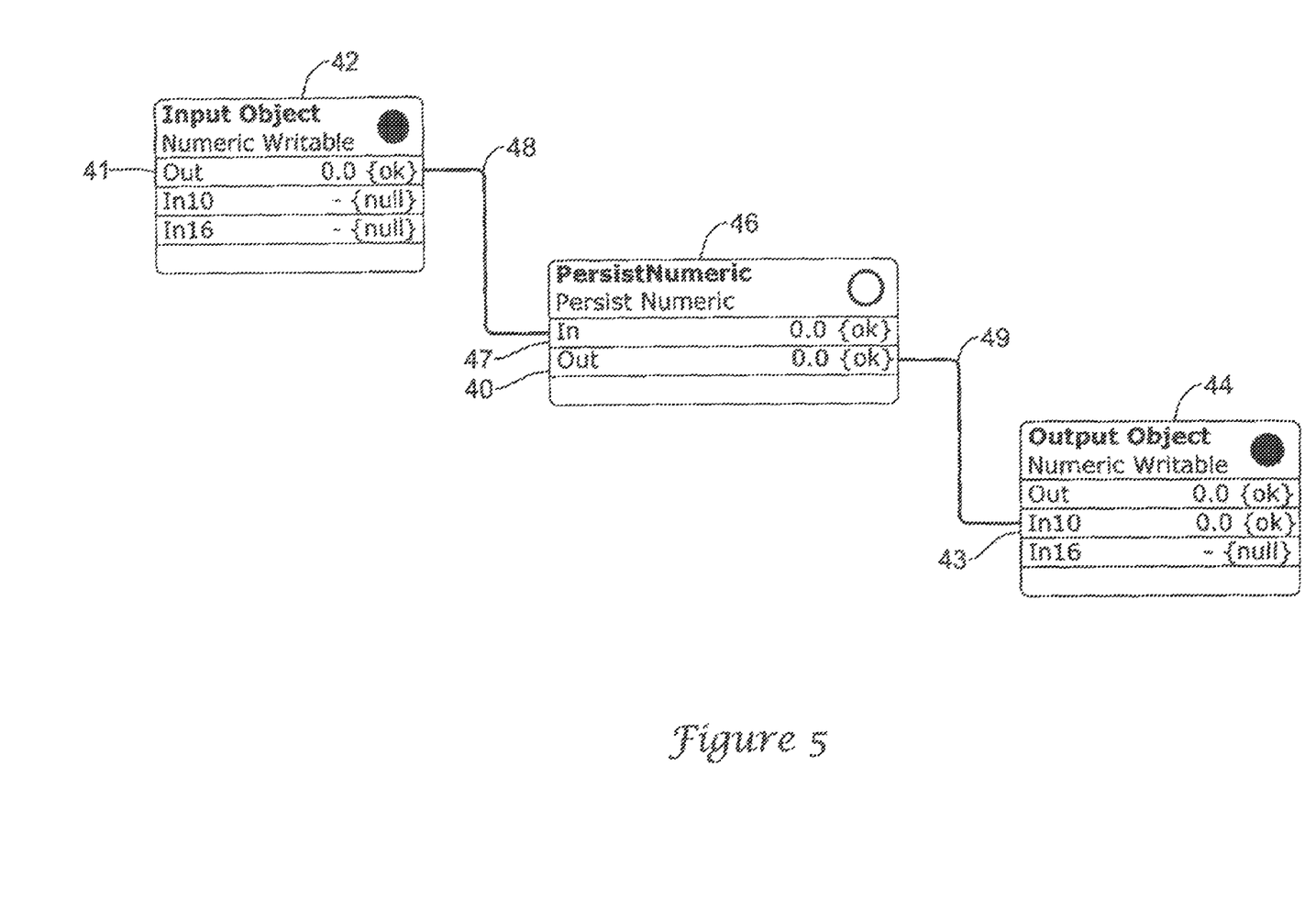
FIG. 5 is a diagram of a control sequence relative to an input object, a persist object and an output object.

FIG. 5 is a diagram showing a simple control sequence using NiagaraAX with the invention. Data comes from "Out" slot 41 in Input Object 42 to "In" slot 47 of Persist Numeric 46 via line 48, and then from "Out" slot 40 of Persist Numeric 46 to "In 10" slot 43 of Output Object 44 via line 49. Upon a first invocation of "changed( )" callback, Persist Numeric 46 will ignore the value of "In" slot 47 and instead load a value from its persistence file in the JACE's file system. The Persist Numeric 46 will then set the value of its "Out" slot 48 to that value effectively restoring the persisted value. This value is then passed to the downstream component Output Object 44. Upon subsequent invocations of the "changed( )" callback, Persist Numeric 46 will store the "In" slot 47 value to its persistence file and pass the value on to the Output Object 44 effectively accomplishing an immediate save of Input Object's value when it changes.

Figure 6:
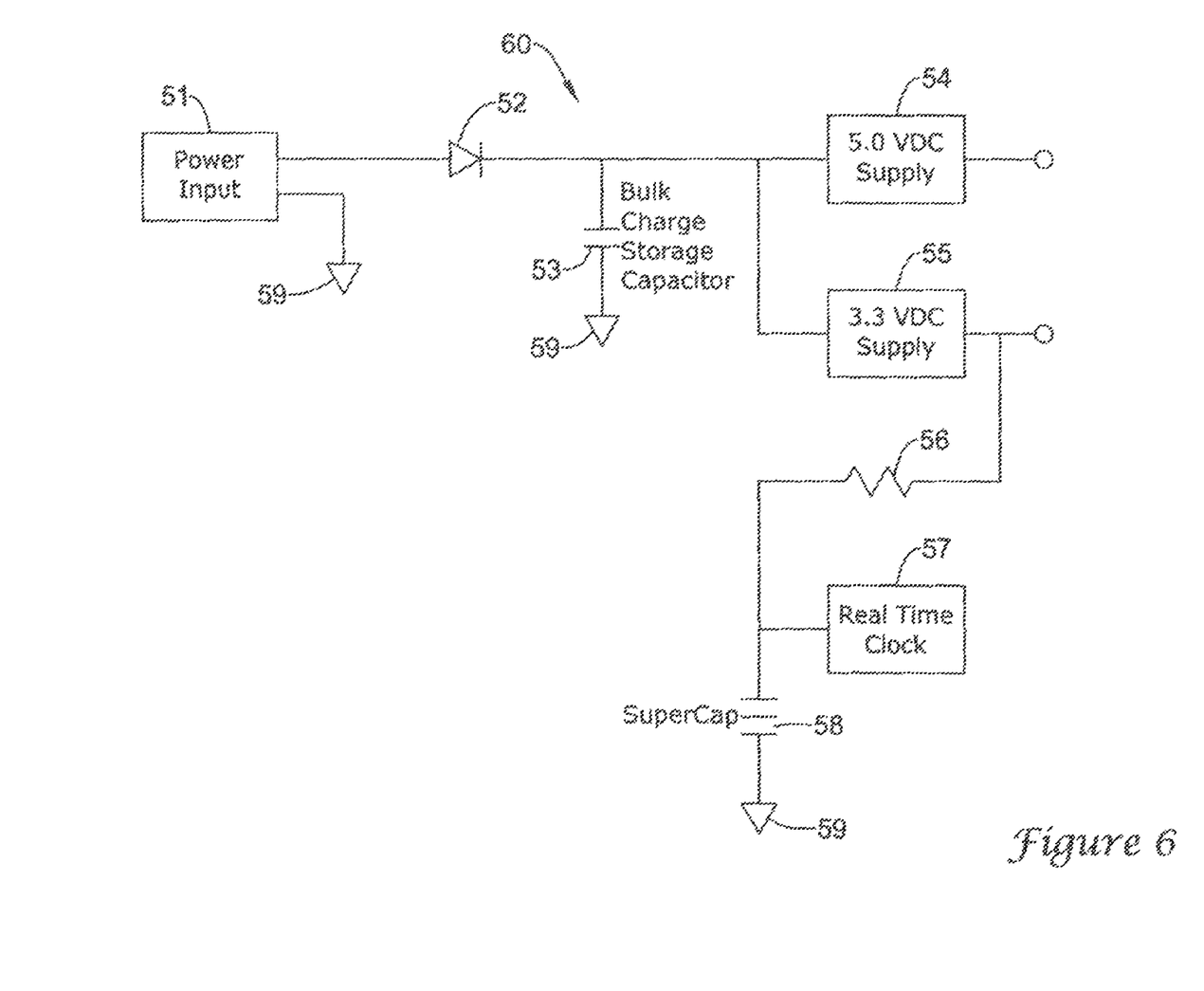
FIG. 6 is a diagram of a backup power system without a battery pack.

FIG. 6 is a diagram of the present reduced power supply 60, relative to the regular backup power supply 70 (FIG. 7), for the JACE computing platform as used with the present shut-down system. It may be a battery-less charge source having a traditional filter capacitor storage of electrical energy for enabling operation of the computing platform after a loss of power to the computing platform for a period of time sufficient for a persist object to persist a value of a control object.

Supply 60 may have a power input structure 51 with one terminal connected to a ground or reference voltage 59, and another terminal connected to an anode of a diode 52. It may be noted that when the power at input 51 fails, there appears very little power from supply 60 to back up the system connected to the supplies 54 and 55, in comparison to that of supply 70.

In supply 60, the cathode of diode 52, which effectively is a rectifier of the input power 51, may be connected to a bulk charge storage capacitor 53, and to the 5.0 VDC and 3.3 VDC supplies 54 and 55, respectively. An output of the 3.3 VDC supply may be connected to a resistor 56 which in turn is connected to a super capacitor 58 and a real time clock 57. The present system is designed so that the JACE computing platform can shut down properly with this reduced power supply upon a loss of power at input 51.

Figure 7:
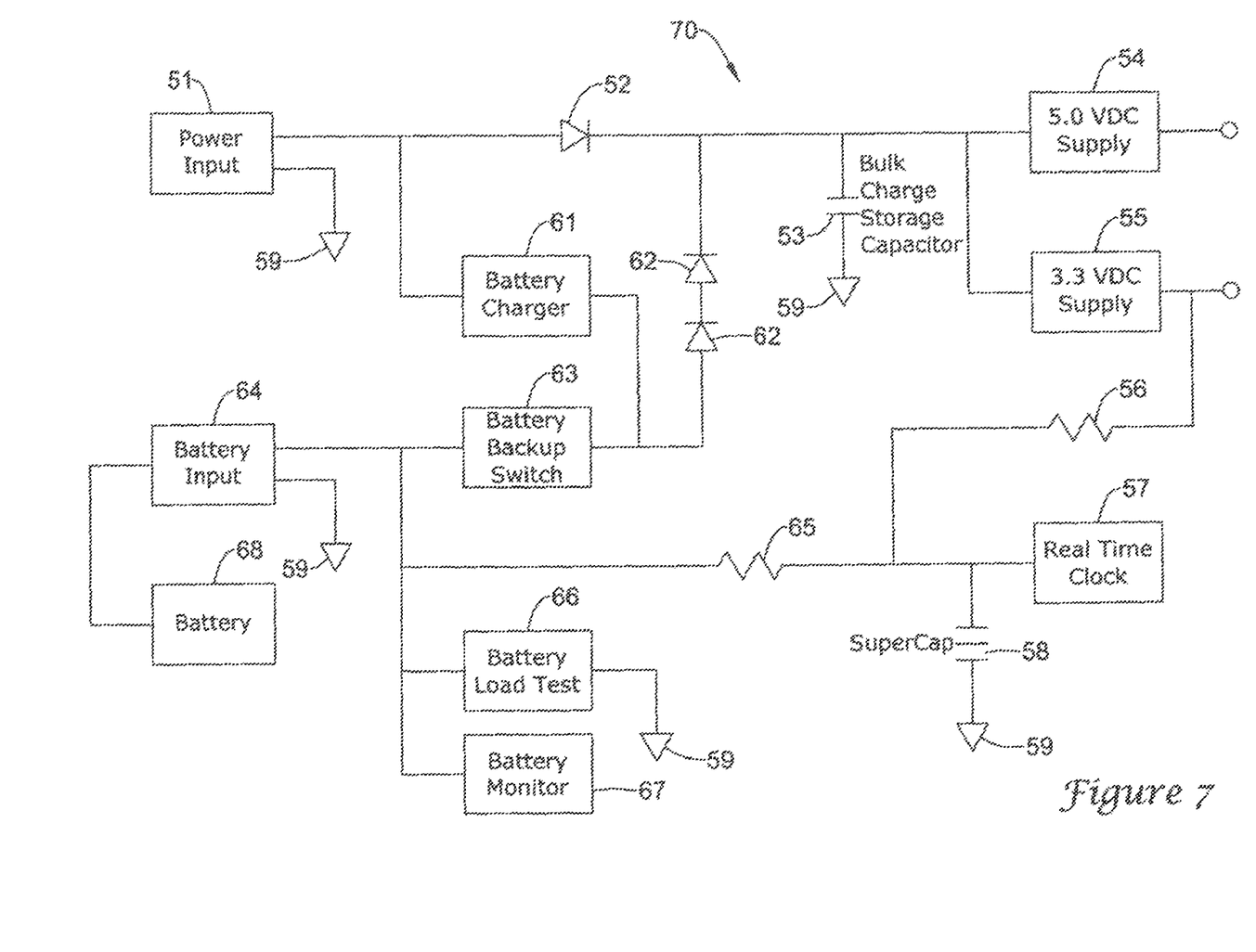
FIG. 7 is a diagram of a power system with a backup battery pack.

FIG. 7 is a diagram of power supply 70 requiring a battery input 64 connected to a battery 68 for sustaining a proper shut-down of the JACE computing platform by the regular JACE shut-down system upon a loss of power at power input structure 51. Other components of power supply 70 may include a battery charger 61 connected to the power input 51 and to the battery input 64 via a battery backup switch 63. Backup power from battery input 64 may go power supplies 54 and 55 via the battery backup switch 63 and steering diode(s) 62 connected series. Battery input 64 may connected to a battery load test component 66 and a battery monitor 67. The battery input 64 may also be connected to the circuit shown in FIG. 6 including resistor 56, real time clock 57 and super capacitor 58, via a series-connected resistor 65.

The present shut-down system makes it possible to eliminate the components 61-68 of the circuit shown in FIG. 7 and still provide a proper shut-down of the JACE computing platform upon an unexpected power loss at input 51, such that the platform can be brought up to normal operating condition without problems upon a return of power.

In the present specification, some of the matter may be of a hypothetical or prophetic nature although stated in another manner or tense.

Although the invention has been described with respect to at least one illustrative example, many variations and modifications will become apparent to those skilled in the art upon reading the present specification. It is therefore the intention that the appended claims be interpreted as broadly as possible in view of the prior art to include all such variations and modifications.

What is claimed is:

1. An application control engine system comprising:
   a dedicated computing platform;
   a plurality of control objects in operating software of the platform; and
   a shut-down mechanism connected to the computing platform; and
   wherein:
   the shut-down mechanism is for assuring a save of last known values of the control objects during normal operation of the computing platform;
   the shut-down mechanism comprises a battery-less charge storage source for keeping the computing platform in normal operation upon a loss of regular power until a saving of the values of the control objects is or is assured as adequate so that the computing platform can return to normal operation virtually immediately upon a return of the regular power; and
   the shut-down mechanism comprises persist objects for saving the last known values of the control objects routinely during normal operation of the computing platform.

2. The system of claim 1, wherein the battery-less charge source comprises a traditional filter capacitor storage of electrical energy for enabling operation of the computing platform after a loss of power to the computing platform for a period of time sufficient for a persist object to persist a value of a control object.

3. The system of claim 1, wherein the battery-less charge source comprises a traditional filter capacitor storage of electrical energy for enabling operation of the computing platform after a loss power to the computing platform for a period of time sufficient for a persist object to persist a value of control object.

4. The system of claim 3, wherein the period of time sufficient to persist a value of a control object is less than 20 milliseconds.

5. The system of claim 2, wherein a value of a control object is a runtime, operation setting and/or parameter value.

6. The system of claim 3, wherein the computing platform is a Java™ application control engine (JACE) computing platform.

7. The system of claim 1,
   wherein:
   an input slot of a persist object is attached to an output slot of a control object of the plurality of control objects;
   an output slot of the persist object is attached to an input slot of a target control object;
   the output slot of the control object provides a runtime, operation setting, and/or parameter value to the input slot of the persist objet which is to preserve the value; and
   the output slot of the persist object is to provide the value preserved by the persist object to the target object after the power interruption ceases.

8. A system for a computing platform comprising:
   a JACE computing platform;
   a plurality of control objects in computing platform software;

a component integral to the platform for persisting to storage the most recent runtime, operational setting and/or parameter values of the control objects;

one or more persist objects connected to one or more of the plurality of control objects, wherein the one or more persist objects are for saving the last known values of the control objects routinely during normal operation of the computing platform; and a battery-less charge storage connected to the computing platform for continued runtime upon a power-interruption sufficient to persist remaining values as needed to storage; and wherein upon the power interruption, the control objects are or have been set to the most recent persisted runtime and operational setting and/or parameter.

9. The system of claim 8, further comprising:

a plurality of wiresheets for connecting control objects with persist objects; and wherein a persist object is connected between it control object, whose runtime, operational setting and/or parameter value is to be persisted, and a control object which is to receive the runtime, operational setting and/or parameter value.

10. The system of claim 9, further comprising:

a "changed( )" callback mechanism; and wherein:

the "changed( )" callback mechanism is invoked on an object when a value of the object is changed:

a persist object uses the "changed ( )" callback mechanism to determine when to write a current value of an object to persistent storage and when to read a persisted current value back into the persist object; and the persisted current value is a restoration of a most recent runtime, operational setting and/or parameter value of the control object for use of the value by a next downstream control object.

11. The system of claim 10, wherein to ensure that values are persisted upon a power failure, an amount of time to persist a value of an object is less than an amount of runtime provided by the battery-less charge storage, for the computing platform after the power failure.

12. The system of claim 10, wherein a value of an object is persisted virtually immediately when charged.

13. The system of claim 10, further comprising:

an anti-thrash algorithm; and wherein the anti-thrash algorithm limits a number of persists of values to the persistence storage and/or values are persisted to the persistence storage only if the values have changed by more than a specified increment.

14. An application control engine system comprising:

a dedicated computing platform;

one or more control objects in operating software of the platform;

one or more persist objects far saving the last known values of the one or more control objects routinely during normal operation of the computing platform; and a battery-less charge storage source for keeping the computing platform in normal operation upon a loss of regular power until a saving of the values of the control objects is or is assured as adequate so that the computing platform can return to normal operation virtually immediately upon a return of the regular power.

15. The system of claim 14, wherein for a persist object to save a last, known value of a control object is to persist the value of the control object.

* * * * *